May 28, 1929. T. L. CARPENTER ET AL 1,715,221
BED ATTACHMENT FOR VEHICLES
Filed Sept. 22, 1926  2 Sheets-Sheet 1

T. L. Carpenter
R. L. Zachary
INVENTOR

BY Victor J. Evans
ATTORNEY

May 28, 1929.  T. L. CARPENTER ET AL  1,715,221
BED ATTACHMENT FOR VEHICLES
Filed Sept. 22, 1926  2 Sheets-Sheet 2
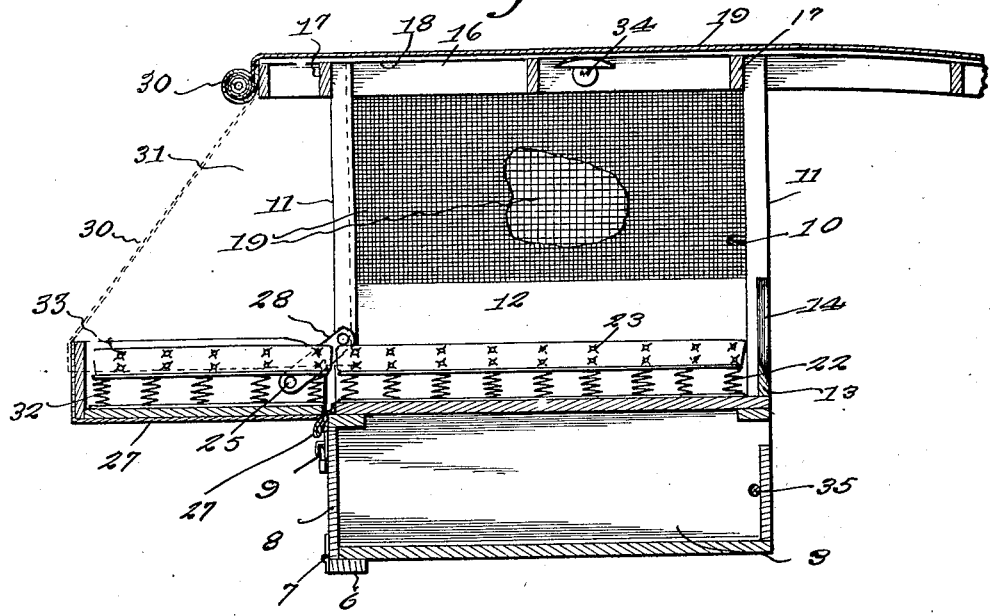
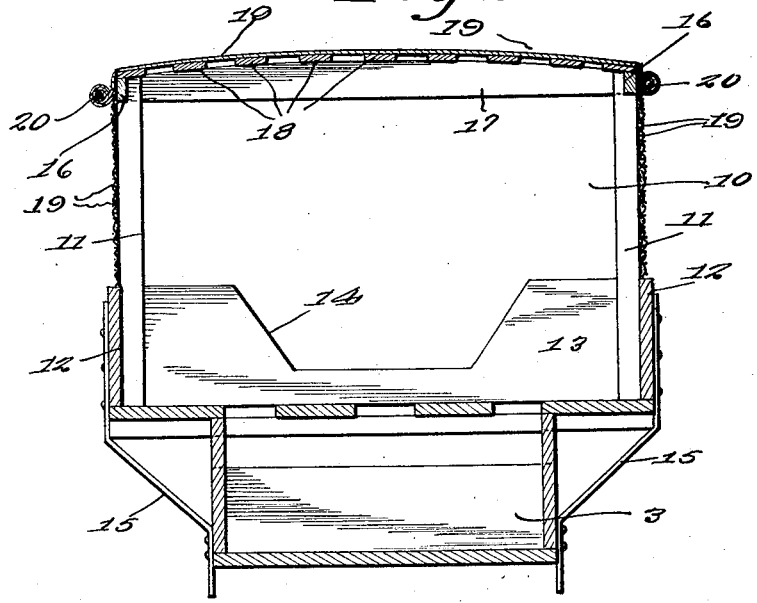
T. L. Carpenter
R. L. Zackary
INVENTOR
BY Victor J. Evans
ATTORNEY
WITNESS:

Patented May 28, 1929.

1,715,221

UNITED STATES PATENT OFFICE.

THOMAS L. CARPENTER AND ROY L. ZACHARY, OF MARLOW, OKLAHOMA.

BED ATTACHMENT FOR VEHICLES.

Application filed September 22, 1926. Serial No. 137,036.

An object of our present invention is the provision of sleeping quarters for automobiles, of a construction which does not interfere with the appearance of the automobile, and which snugly accommodates the occupants thereof and protects them from weather conditions and from insects, and which also does not interfere with the rear view of the driver when the device is not in set up condition for the occupants thereof.

A further object is the provision of an attachment for automobiles that provides sleeping quarters for the occupants thereof, in which the lower portion of the improvement affords a compartment for luggage or the like, and in which the bed is made up of a fixed and a hinged section, the latter normally closing the major portion of the rear of the improvement, the sides of the improvement being partly open but being covered with both sand and insect screens, means being provided for effectively holding the hinged bed section in longitudinal alinement with the fixed bed section or at right angles thereto, while the whole of the improvement is provided with curtains that may be readily folded or let down to suit weather conditions and the desire of the occupants of the device.

A still further object is the provision of an attachment for this purpose which may be easily and rigidly secured upon the body of an automobile in an expeditious manner and which includes both storage and sleeping compartments as well as a top that fully covers the sleeping compartment and the front portion of the automobile, there being means for permitting the proper ventilation of the sleeping quarters, illuminating the same and protecting the same from the elements and from insects.

To the attainment of the foregoing the improvement also resides in certain novel features of construction, combination and operative association of parts, a satisfactory embodiment of which is disclosed by the accompanying drawings.

In the drawings:

Figure 3 is a sectional view similar to Figure 2 but showing the swingable bed section brought to align with the fixed bed section.

Figure 4 is a sectional view on the line 4—4 of Figure 2 with the mattress and springs removed.

While our improvement is primarily devised for use in connection with automobiles, the same may be successfully employed in connection with small trucks.

Figure 1:
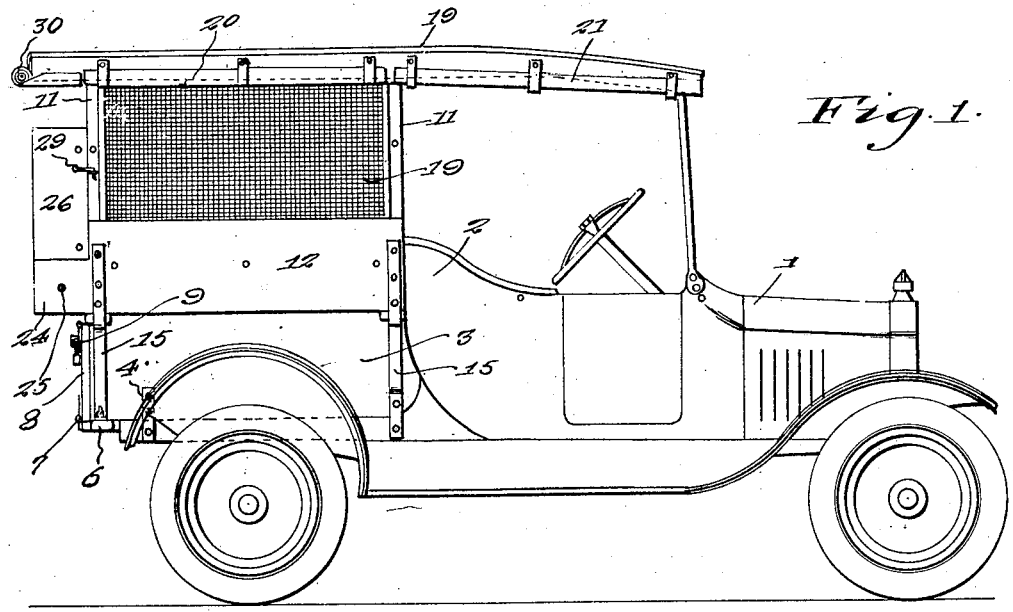
Figure 1 is a side elevation of an automobile provided with the improvement.

An automobile 1 of the roadster type is illustrated by Figure 1 of the drawings, and the same has the cover for its rear deck, commonly termed the turtle back, removed.

Arranged over the bed of the automobile, directly in the rear of the back of the seat 2, there is the lower box-like portion 3 of our improvement. This portion 3 is of a width equaling that of the automobile bed but may be of a greater length than said bed. The rectangular hollow base 3 of the improvement has bolted on its sides brackets 4 which are bolted to the sides of the automobile bed, and the under face of the compartment 3, at the outer and open end thereof has secured thereon a transversely extending beam 6 which projects beyond the sides of the said compartment. To this beam 6 there is hinged, as at 7, a door 8 which is swingable to close the compartment 3, the said door being locked in closed position by means indicated by the numeral 9. Having its base or bottom resting upon the top of the compartment 3 there is the upper sleeping compartment 10 of the improvement. This compartment is of a greater width than the compartment 3, the latter compartment serving as a storage for luggage and the like. The compartment 10 has its corners provided with upstanding beams 11, and to these beams there are secured the lower side boards 12 of the said compartment and to the front beams there is secured the front board 13 of the said compartment. The board 13 is centrally notched or cut-away, as at 14, to accommodate the rear portion of the seat 2, and to the side boards 12 and the sides of the luggage compartment 3 there are fixed the straight ends of angle braces 15. The forward angle braces 15 depend beyond the sides of the luggage compartment 3 and are bolted or otherwise secured to the sides of the bed of the automobile, while the rear angle braces 15 have their straight lower ends bolted or otherwise secured to the ends of the beam 6. These brace elements, together with the bolts that pass through the floor of the compartment 3 and the bed or frame of the automobile effectively secure the improvement on the body of the machine. The beams or uprights 11 have fixedly secured to their upper edges longitudinally extending wooden plate 16, the same being of materially greater length than the side boards 12 of the sleeping compartment 10 inasmuch as these plates extend over the seat 2 and over the windshield of the automobile 1 as well as extending a suitable distance rearwardly with respect to the compartment 10. Transverse plates 17 are secured between the plates 16 and the uprights 11. On the upper rounded edges of the plate 17, as well as on the longitudinal plates 16 there are longitudinally extending slats 18 and fixed on the side plates 16 and on the slats 18 there is a fabric cover 19. The cover 19 it will be noted protects both the compartment 10 and the seat 2 of the automobile.

The front of the compartment 10 is open at the top portion thereof, and there are, of course, openings between the boards 12 and the plates 16 at the sides of the compartment. These lateral openings are covered by reticulated plates 19. Two of such plates are arranged against each other, one of the plates being in the nature of a sand screen and the other being in the nature of an insect netting. By the arrangement of these plates dust will not be permitted to enter the sides of the compartment 10 nor can insects enter such compartment. The sides of the compartment may be covered by curtains 20 which are fixed to the plates 12 and are held in rolled condition thereon by suitable straps. These covers 20 are provided with eyes to be engaged by the usual fasteners common in the automobile industry. The forward end of the plates 16 are provided with similar curtains 21 that are designed to protect the seat 2 and the occupants thereof during rainy weather.

Figure 2:
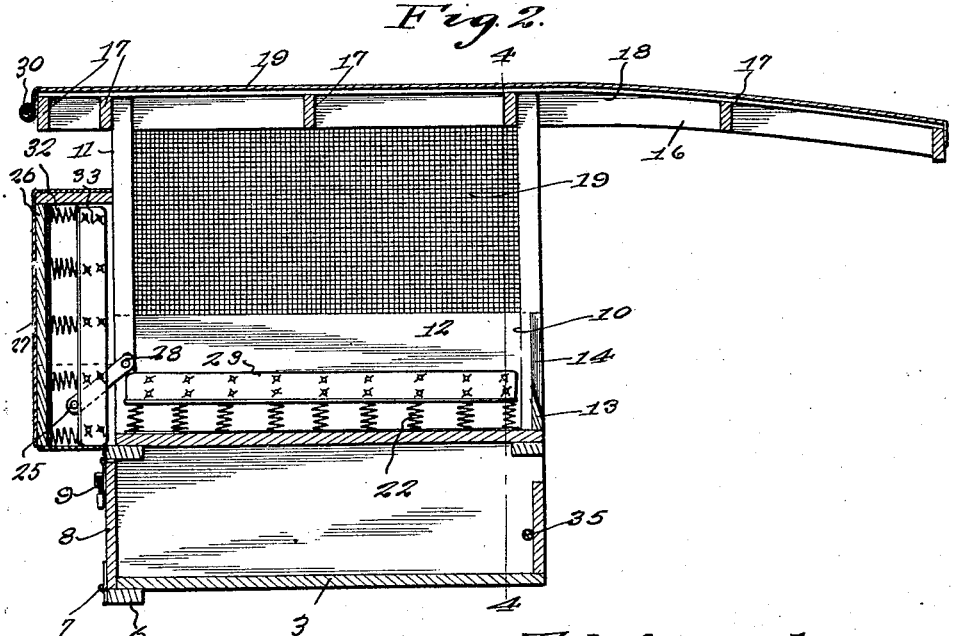
Figure 2 is a central longitudinal sectional view through the improvement detached from the automobile.

The bottom or base of the compartment 10 has arranged thereon springs 22 for a mattress section 23. The mattress is of a length and width equaling that of the sleeping compartment 10. The lower closed sides of the compartment which I have referred to as the boards 12, are each provided, at their rear ends, with reduced substantially rectangular extensions 24, and passing transversely through each of these extensions and through the sides thereof there are bolt members 25, which bolts are engaged by suitable nuts. The back for the compartment 10, which is indicated by the reference numeral 26, is in reality a movable bed section and includes a base, relatively deep sides and a rear closed end. Between the open end of the back and the outer end of the floor or base of the compartment 10 there are fixed the ends of a fabric sheet 27, and this sheet is of the same material as is the cover 19 for the top and the curtains. Also the back is preferably covered by a facing of similar material, as indicated by the numeral 27. Between the pivot bolts 25 and the rear posts or uprights 11 there are angle braces 28. These braces in the form of links, together with the contacting engagement of the inner edge of the back with the outer edge of the compartment 10 holds the said back in longitudinal alignment with the said compartment 10, when the back is in let down position. The sides of the back or movable bed section are provided with latching means 29 to be received in eyes secured in the rear posts 11 when the back is swung to closed position and the latching means 29 together with the links 28 hold the movable bed section in closed position, the links acting to support the movable bed section in both of its positions as will be apparent upon inspection of Figures 2 and 3 of the drawings. It is to be noted that the back is of a depth equaling or slightly less than the projecting rear portion of the top of the device, so that such portion of the top will overlie the back when the latter is in closed position. It will be further noted that the length of the back is such as to arrange the same a suitable distance below the top when the back is in closed position. This is important inasmuch as the driver looking into the rear visioning mirror out of the machine can observe conditions at the rear of the automobile.

Normally rolled on the rear of the top of the device there is a curtain 30 sustained in rolled condition by the usual straps. This curtain has side flaps 31. The curtain and the side flaps thereof are designed to cover the rear and sides of the back member 26 when the latter is in its lowered position. The base or bottom of the back member supports thereon springs 32 and resting on these springs there is a mattress section 33. The mattress section 33 is brought into longitudinal alignment with the mattress section 22 when the back member 26 is lowered, and thus the mattresses afford a convenient bed of the desired length for the occupants of the automobile when camping. In the top of the compartment 10 there is a lamp bulb 34 wired to the electric system of the machine and this bulb may be lighted to illuminate the interior of the sleeping compartment when desired, a suitable switch controlling the circuit to the lamp.

The improvement is of a comparatively simple construction, and does not detract from the appearance of the automobile on which the same is arranged. The improvement not only provides simple and convenient sleeping quarters but the compartment 3 affords ample space for the storage of luggage or for other articles desired by the occupants of the automobile. It is only necessary to lower the rear curtain 30 and its flaps 31 for the privacy of the occupants of the compartment 10, as the double screens 19 prevent outsiders observing conditions in the compartment. The front of the compartment being open and the sides thereof being screened a proper ventilation of the compartment and the exclusion of insects from the compartment will be insured. In stormy weather all of the curtains are let down and fastened so that the occupants are insured against such weather conditions. The improvement may be cheaply constructed and easily applied and may be likewise easily removed after a touring trip. To more effectively brace the device we preferably pass through the front of the storage compartment 3 a bolt member 35 that also passes through the front braces 15, or if desired, through the side beams for the bed of the automobile.

Obviously the partly open front of the sleeping compartment may be provided with a curtain for closing the same.

While the improvement is illustrated in connection with an automobile of the roadster type, it is to be understood that the same may be employed in connection with touring cars by simply removing the back seat of such type of vehicles, and also the improvement may be applied on trucks.

Having described the invention, we claim:—

In a vehicle body, a compartment including sides, rectangular extensions formed with the rear ends of the sides by reducing the latter, a back for the compartment and including a base, sides, a rear closed end, and an open front end disposed toward the compartment when the back is aligned therewith, bolt and nut connections pivotally securing the back to the extensions and passing through the latter and the sides of the back, uprights for said compartment, a single link for each side of the back and pivotally received at one end by the bolts of the bolt and nut connections, while the opposite ends of the links are pivotally secured to the uprights at points thereon to hold the back in alignment with the compartment when the back is so disposed and at right angles to the compartment when disposed to close the same, and a facing for the back and closing the open end thereof when the back is disposed in its last mentioned position.

In testimony whereof we affix our signatures.

THOMAS L. CARPENTER.
ROY L. ZACHARY.